US012567245B2

(12) United States Patent
Murrish et al.

(10) Patent No.: US 12,567,245 B2
(45) Date of Patent: Mar. 3, 2026

(54) LOCALIZATION FROM SPECULAR CONSTELLATIONS

(71) Applicant: PACCAR Inc, Bellevue, WA (US)

(72) Inventors: Robert Wesley Murrish, Santa Clara, CA (US); Brandon Leobardo Racca, Mountain View, CA (US); Haris Ashraf, Carlsbad, CA (US)

(73) Assignee: PACCAR Inc, Bellevue, WA (US)

( * ) Notice: Subject to any disclaimer, the term of this patent is extended or adjusted under 35 U.S.C. 154(b) by 571 days.

(21) Appl. No.: 17/936,145

(22) Filed: Sep. 28, 2022

(65) Prior Publication Data

US 2024/0104909 A1 Mar. 28, 2024

(51) Int. Cl.
| | |
|---|---|
| *G06V 10/80* | (2022.01) |
| *B60W 60/00* | (2020.01) |
| *G01C 21/16* | (2006.01) |
| *G06V 20/58* | (2022.01) |

(52) U.S. Cl.
CPC ......... *G06V 10/803* (2022.01); *B60W 60/001* (2020.02); *G01C 21/16* (2013.01); *G06V 20/584* (2022.01); *B60W 2556/40* (2020.02); *B60W 2556/45* (2020.02)

(58) Field of Classification Search
CPC .... G06V 10/803; G06V 20/584; G06V 10/60; B60W 60/001; B60W 2556/40; B60W 2556/45; G01C 21/16
See application file for complete search history.

(56) References Cited

U.S. PATENT DOCUMENTS

| | | | | |
|---|---|---|---|---|
| 9,103,671 B1* | 8/2015 | Breed | ................... | G01S 13/865 |
| 9,395,727 B1* | 7/2016 | Smith | ....................... | G01S 7/03 |
| 9,436,880 B2* | 9/2016 | Bos | ....................... | B60Q 9/008 |
| 10,486,485 B1* | 11/2019 | Levinson | ........... | B60G 17/0162 |
| 10,558,866 B2* | 2/2020 | Potter | ................... | G01S 17/88 |
| 11,435,439 B2* | 9/2022 | Smith | ................... | G01S 13/931 |
| 11,509,875 B1* | 11/2022 | Herman | ................. | H04M 1/22 |
| 11,754,415 B2* | 9/2023 | Castorena Martinez | ................... | |
| | | | | G06V 20/64 |
| | | | | 701/455 |
| 11,761,780 B1* | 9/2023 | Duenas Arana | ..... | G01C 21/387 |
| | | | | 701/533 |
| 11,841,437 B2* | 12/2023 | Zhu | ...................... | G05D 1/0278 |

(Continued)

OTHER PUBLICATIONS

R. Kardan, S. S. Roy, A. Elsaharti and J. Neubert, "Machine Learning Based Specularity Detection Techniques to Enhance Indoor Navigation," 2023 IEEE 17th International Conference on Semantic Computing (ICSC), Laguna Hills, CA, USA, 2023, pp. 143-148, doi: 10.1109/ICSC56153.2023.00030. (Year: 2023).*

(Continued)

*Primary Examiner* — Angelina M Shudy

(57) ABSTRACT

Localization of a vehicle based at least in part on a map of reflective objects having specular reflectivity. A specular constellation map generation system and method are used to create a mapping of location, orientation, and reflectivity values of reflective objects in a driving surface. A specular constellation localization system and method collect reflection data associated with a driving surface and generate a constellation of specular highlights associated with the reflection data. The constellation of specular highlights can be used in conjunction with a location of a light source and the mapping of reflective object values to determine a pose of the vehicle.

19 Claims, 7 Drawing Sheets

(56) References Cited

U.S. PATENT DOCUMENTS

| | | | | |
|---|---|---|---|---|
| 11,874,539 | B1 * | 1/2024 | Philipp | H04N 23/55 |
| 12,103,561 | B2 * | 10/2024 | Duan | G01S 17/931 |
| 12,392,619 | B2 * | 8/2025 | Sakr | G01S 13/89 |
| 12,444,207 | B2 * | 10/2025 | Kawanai | B60W 60/00 |
| 2004/0143380 | A1 * | 7/2004 | Stam | H05B 47/165 |
| | | | | 340/467 |
| 2004/0148057 | A1 * | 7/2004 | Breed | G02B 13/008 |
| | | | | 700/242 |
| 2010/0020170 | A1 * | 1/2010 | Higgins-Luthman | |
| | | | | G06V 20/56 |
| | | | | 348/135 |
| 2010/0114374 | A1 * | 5/2010 | Cho | G06T 7/514 |
| | | | | 901/1 |
| 2010/0296724 | A1 * | 11/2010 | Chang | G06V 20/647 |
| | | | | 382/154 |
| 2010/0329513 | A1 * | 12/2010 | Klefenz | G06T 7/73 |
| | | | | 348/148 |
| 2011/0164811 | A1 * | 7/2011 | Ishiyama | G06V 40/169 |
| | | | | 382/154 |
| 2012/0050074 | A1 * | 3/2012 | Bechtel | G06V 10/147 |
| | | | | 382/104 |
| 2013/0177202 | A1 * | 7/2013 | Dierks | B60Q 1/08 |
| | | | | 362/466 |
| 2013/0226344 | A1 * | 8/2013 | Wong | G05D 1/0242 |
| | | | | 901/1 |
| 2013/0286172 | A1 * | 10/2013 | Sasaki | A61B 1/00188 |
| | | | | 348/65 |
| 2014/0333468 | A1 * | 11/2014 | Zhu | G01S 13/867 |
| | | | | 342/54 |
| 2016/0059418 | A1 * | 3/2016 | Nakamura | G05D 1/0274 |
| | | | | 901/1 |
| 2016/0063861 | A1 * | 3/2016 | Lee | G08G 1/14 |
| | | | | 340/932.2 |
| 2016/0078611 | A1 * | 3/2016 | Butts | G01S 13/867 |
| | | | | 382/110 |
| 2016/0231746 | A1 * | 8/2016 | Hazelton | G05D 1/0274 |
| 2016/0307053 | A1 * | 10/2016 | Aycock | G06V 40/172 |
| 2016/0358477 | A1 * | 12/2016 | Ansari | B60W 60/0059 |
| 2017/0123048 | A1 * | 5/2017 | Siemes | G08G 1/096758 |
| 2017/0199274 | A1 * | 7/2017 | Sasabuchi | G01S 13/867 |
| 2018/0005012 | A1 * | 1/2018 | Aycock | G01J 4/04 |
| 2018/0189978 | A1 * | 7/2018 | Dong | G06T 11/001 |
| 2019/0033879 | A1 * | 1/2019 | Templeton | G01S 17/931 |
| 2019/0219697 | A1 * | 7/2019 | Castorena Martinez | |
| | | | | G01S 17/86 |
| 2019/0271767 | A1 * | 9/2019 | Keilaf | G01S 17/931 |
| 2019/0316929 | A1 * | 10/2019 | Shin | G05D 1/0246 |
| 2019/0323843 | A1 * | 10/2019 | Yu | G01S 17/89 |
| 2019/0353780 | A1 * | 11/2019 | Statnikov | G01S 13/931 |
| 2019/0369212 | A1 * | 12/2019 | Dylewski | G01S 17/87 |

| | | | | |
|---|---|---|---|---|
| 2019/0391270 | A1 * | 12/2019 | Uehara | G01S 17/04 |
| 2020/0042001 | A1 * | 2/2020 | Chu | G01S 13/931 |
| 2020/0057155 | A1 * | 2/2020 | Achour | G01S 13/02 |
| 2020/0142069 | A1 * | 5/2020 | Onal | G01S 7/4817 |
| 2020/0282929 | A1 * | 9/2020 | Kroeger | G01S 7/497 |
| 2021/0009137 | A1 * | 1/2021 | Herman | G01S 17/931 |
| 2021/0157330 | A1 * | 5/2021 | Tran | G06V 10/82 |
| 2021/0264169 | A1 * | 8/2021 | Speigle | G06T 3/4015 |
| 2021/0300517 | A1 * | 9/2021 | Wong | G05D 1/661 |
| 2021/0319218 | A1 * | 10/2021 | Wada | G06T 7/60 |
| 2022/0082689 | A1 * | 3/2022 | Kim | G01S 15/46 |
| 2022/0107391 | A1 * | 4/2022 | Ren | G06V 20/58 |
| 2022/0189054 | A1 * | 6/2022 | Kaiser | G06V 20/582 |
| 2022/0197301 | A1 * | 6/2022 | Moawad | G01S 13/876 |
| 2022/0198935 | A1 * | 6/2022 | Adams | B60W 60/001 |
| 2022/0281456 | A1 * | 9/2022 | Giovanardi | B60W 30/18163 |
| 2022/0373337 | A1 * | 11/2022 | Zeng | G06V 20/56 |
| 2023/0122320 | A1 * | 4/2023 | Sun | G01S 7/4863 |
| | | | | 356/4.01 |
| 2023/0281846 | A1 * | 9/2023 | Pillans | G06T 7/514 |
| | | | | 345/426 |
| 2023/0314567 | A1 * | 10/2023 | Dekel | G01S 7/499 |
| | | | | 356/4.01 |
| 2023/0350064 | A1 * | 11/2023 | Hu | G01S 17/18 |
| 2024/0004391 | A1 * | 1/2024 | Galluzzo | B65G 1/1373 |
| 2024/0010208 | A1 * | 1/2024 | Enam | G01S 7/4972 |
| 2024/0019720 | A1 * | 1/2024 | Philipp | H04N 23/55 |
| 2024/0119857 | A1 * | 4/2024 | Wang | G06N 3/0442 |
| 2024/0184297 | A1 * | 6/2024 | Chen | G01S 17/931 |
| 2024/0300518 | A1 * | 9/2024 | Baltaxe | B60K 35/00 |
| 2024/0353231 | A1 * | 10/2024 | Burlina | G06N 20/20 |
| 2025/0091534 | A1 * | 3/2025 | Schoenberg | G06V 10/60 |
| 2025/0304109 | A1 * | 10/2025 | Thompson | B60W 60/001 |

OTHER PUBLICATIONS

S. Jiddi, P. Robert and E. Marchand, "Detecting Specular Reflections and Cast Shadows to Estimate Reflectance and Illumination of Dynamic Indoor Scenes," in IEEE Transactions on Visualization and Computer Graphics, vol. 28, No. 2, pp. 1249-1260, Feb. 1, 2022 (Year: 2022).*

Imai, Yoshie, et al. "Estimation of multiple illuminants based on specular highlight detection." Computational Color Imaging: Third International Workshop, CCIW 2011, Milan, Italy, Apr. 20-21, 2011. Proceedings 3. Springer Berlin Heidelberg, 2011. (Year: 2011).*

Lee, Giyeon, Jong Kang Park, and Jong Tae Kim. "Multi-Target Passive Indoor Visible Light Positioning Method based on Specular Reflection." IEEE Sensors Journal (2023). (Year: 2023).*

Kardan, Ramtin, "Machine Learning Based Specular Highlight Detection Techniques to Enhanced UAV Indoor Navigation Through Slam" (2022). Theses and Dissertations. 4268. (Year: 2022).*

* cited by examiner

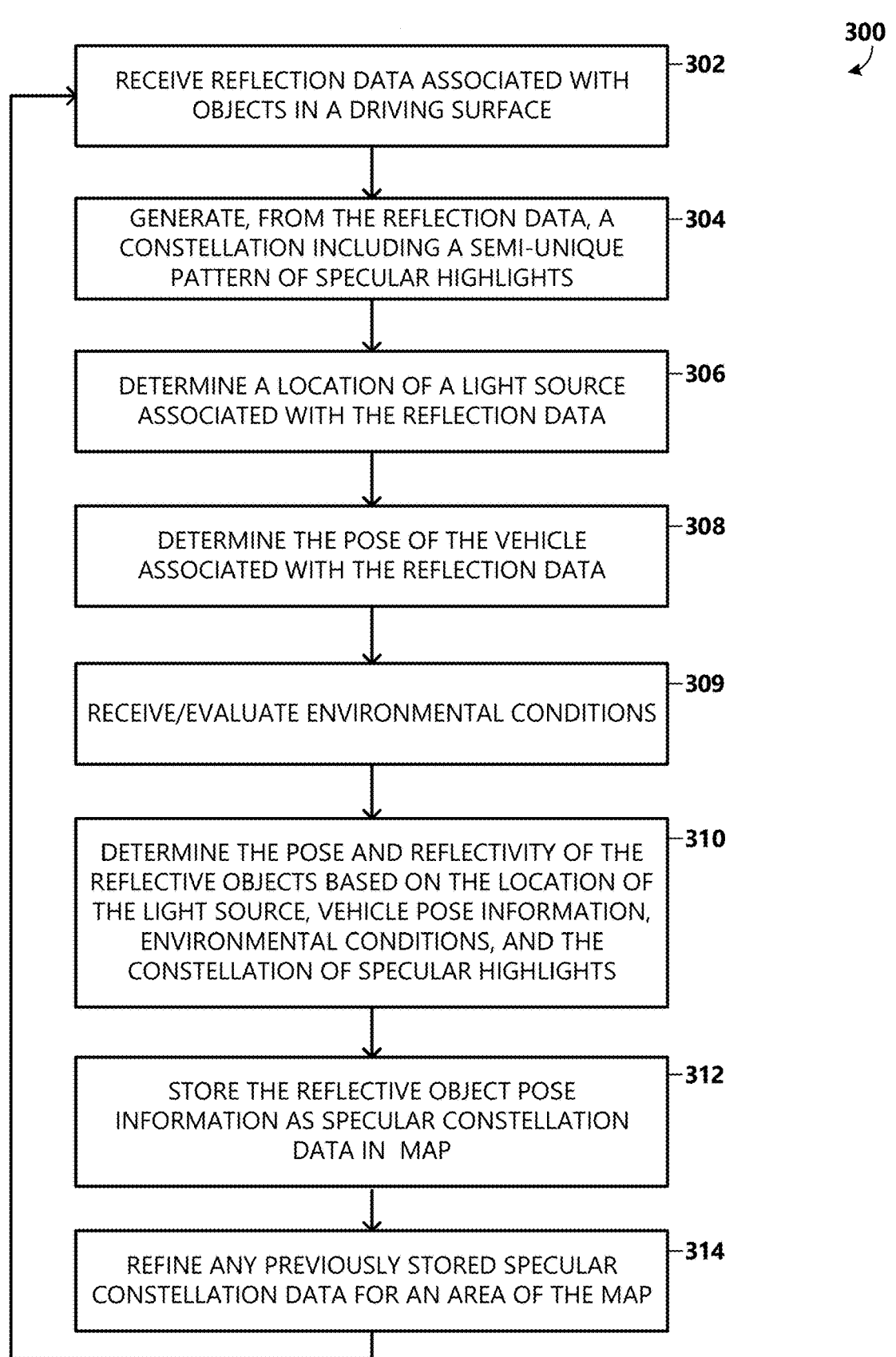

300

RECEIVE REFLECTION DATA ASSOCIATED WITH OBJECTS IN A DRIVING SURFACE —302

GENERATE, FROM THE REFLECTION DATA, A CONSTELLATION INCLUDING A SEMI-UNIQUE PATTERN OF SPECULAR HIGHLIGHTS —304

DETERMINE A LOCATION OF A LIGHT SOURCE ASSOCIATED WITH THE REFLECTION DATA —306

DETERMINE THE POSE OF THE VEHICLE ASSOCIATED WITH THE REFLECTION DATA —308

RECEIVE/EVALUATE ENVIRONMENTAL CONDITIONS —309

DETERMINE THE POSE AND REFLECTIVITY OF THE REFLECTIVE OBJECTS BASED ON THE LOCATION OF THE LIGHT SOURCE, VEHICLE POSE INFORMATION, ENVIRONMENTAL CONDITIONS, AND THE CONSTELLATION OF SPECULAR HIGHLIGHTS —310

STORE THE REFLECTIVE OBJECT POSE INFORMATION AS SPECULAR CONSTELLATION DATA IN  MAP —312

REFINE ANY PREVIOUSLY STORED SPECULAR CONSTELLATION DATA FOR AN AREA OF THE MAP —314

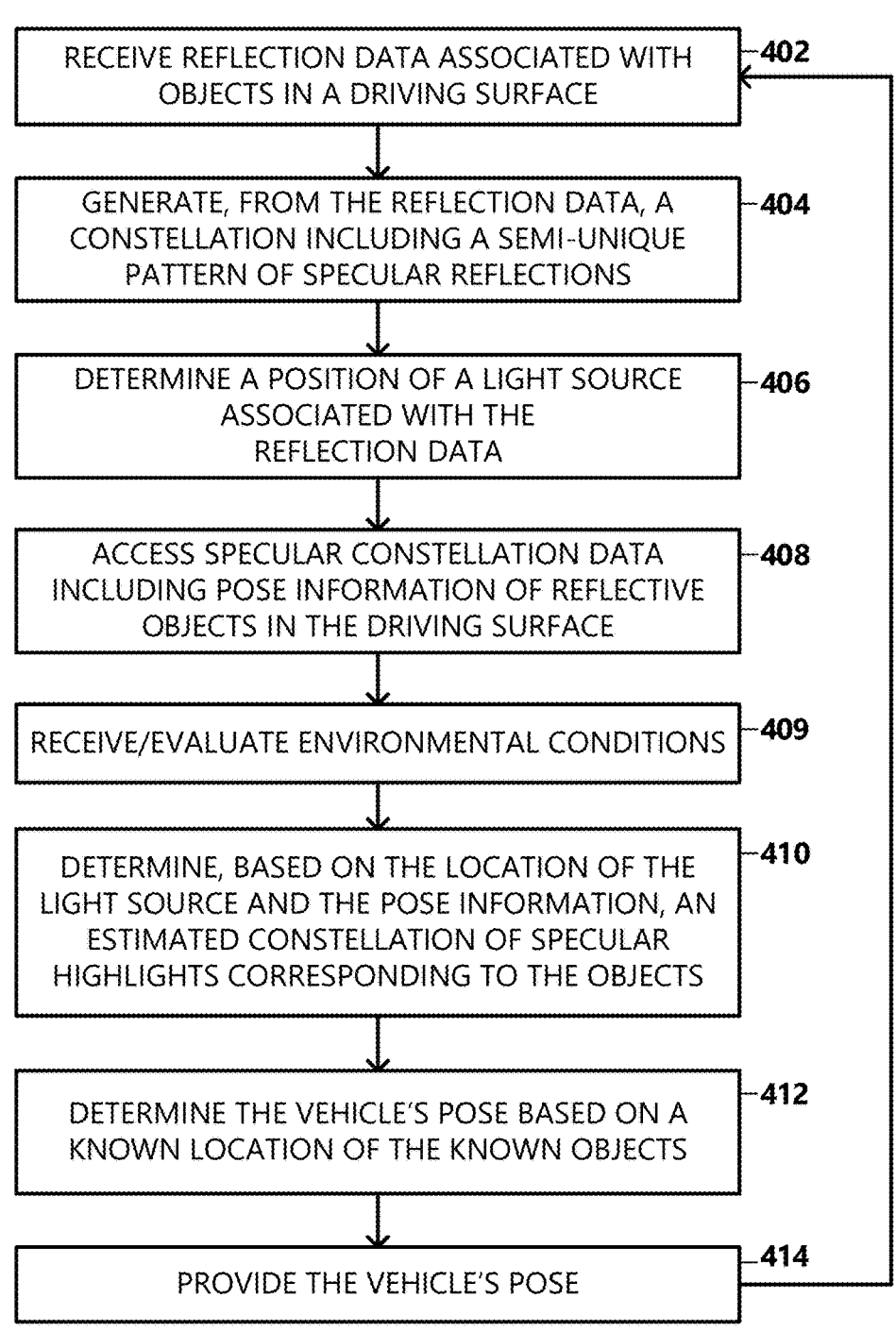

RECEIVE REFLECTION DATA ASSOCIATED WITH OBJECTS IN A DRIVING SURFACE ─402

GENERATE, FROM THE REFLECTION DATA, A CONSTELLATION INCLUDING A SEMI-UNIQUE PATTERN OF SPECULAR REFLECTIONS ─404

DETERMINE A POSITION OF A LIGHT SOURCE ASSOCIATED WITH THE REFLECTION DATA ─406

ACCESS SPECULAR CONSTELLATION DATA INCLUDING POSE INFORMATION OF REFLECTIVE OBJECTS IN THE DRIVING SURFACE ─408

RECEIVE/EVALUATE ENVIRONMENTAL CONDITIONS ─409

DETERMINE, BASED ON THE LOCATION OF THE LIGHT SOURCE AND THE POSE INFORMATION, AN ESTIMATED CONSTELLATION OF SPECULAR HIGHLIGHTS CORRESPONDING TO THE OBJECTS ─410

DETERMINE THE VEHICLE'S POSE BASED ON A KNOWN LOCATION OF THE KNOWN OBJECTS ─412

PROVIDE THE VEHICLE'S POSE ─414

FIG. 4

LOCALIZATION FROM SPECULAR CONSTELLATIONS

BACKGROUND

Localization is oftentimes implemented to determine a position of an object within a small margin of error. In a vehicle, localization is used to detect the vehicle's position with a high degree of accuracy (e.g., 10 cm or less), which enables various assistive and/or automatic vehicle functions. One example function includes a lane keeping function that monitors the vehicle's location related to a lane of a driving surface and automatically warns a driver or makes a steering correction when an unintended lane change (e.g., unsignaled) is detected. As can be appreciated, when the vehicle's position is sensed with a high degree of accuracy, vehicle position with respect to a lane boundary, location on a map, etc., can be better determined, which can improve vehicle safety, navigation, and other vehicle function performance. In one example, being able to determine precise vehicle location on a multi-lane road (e.g., an exact lane of the vehicle) provides opportunities for more accurate navigation instructions and driver assistance/automation from a vehicle location perspective. Performance of other assistive and/or automatic vehicle functions are likewise improved by precise vehicle location information.

Typically, highly accurate localization solutions require expensive hardware. For example, low-cost solutions are typically not able to perform localization at a one-centimeter or two-centimeter level accuracy. Additionally, it may be desirable to have multiple localization systems and/or methods for providing navigation, assistive, and/or automatic vehicle functions. For instance, a failover localization system may be desired when the vehicle is operating in a remote location or in an urban canyon where adequate navigation satellite system coverage may not be available.

While relatively specific examples have been discussed, it should be understood that aspects of the present disclosure should not be limited to solving the specific examples identified in the background.

SUMMARY

The disclosure generally relates to providing localization of a vehicle based at least in part on specular reflectivity of a driving surface on which the vehicle is driving. Examples describe a method for providing localization using specular reflections, comprising: receiving, from a sensor on a vehicle, reflection data corresponding to reflections of a light source off a plurality of reflective objects in a driving surface; generating, from the reflection data, a constellation including a subset of observed specular highlights; determining a location of the light source; accessing a set of values of mapped reflective objects in the driving surface; and using the values of the mapped reflective objects, the location of the light source, and the constellation to estimate a pose of the vehicle.

Examples further describe a method for providing localization using specular reflections, comprising: receiving, from a sensor on a vehicle, reflection data corresponding to reflections of a light source off a plurality of reflective objects in a driving surface; generating, from the reflection data, a constellation including a subset of observed specular highlights; determining a location of the light source; determining a pose of the vehicle; determining a set of values representing a pose of reflective objects associated with the subset of observed specular highlights based on the location of the light source, the pose of the vehicle, and the constellation including the subset of observed specular highlights; and storing the set of values in a map.

Examples further describe a system for providing localization using specular reflections, comprising: at least one processor; and memory storing instructions that, when executed by the at least one processor, cause the system to: receive, from a sensor on a first vehicle, reflection data corresponding to reflections of a first light source off a plurality of reflective objects in a driving surface; generate, from the reflection data, a first constellation including a subset of observed specular highlights; determine a location of the first light source; access a set of pose values of mapped reflective objects in the driving surface; and use the pose values of the mapped reflective objects and the location of the light source to estimate a pose of the first vehicle.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures:

FIG. 18 is an illustration of a vehicle collecting specular reflection data associated with a driving surface according to an example;

FIG. 3 is a flow diagram illustrating example processing steps of a map generation method that can be used to determine and store specular constellation data in a map according to an example;

FIG. 4 is a flow diagram illustrating example processing steps of a localization method that can be used for localizing a vehicle using specular reflection data according to an example;

DETAILED DESCRIPTION

Figure 1A:
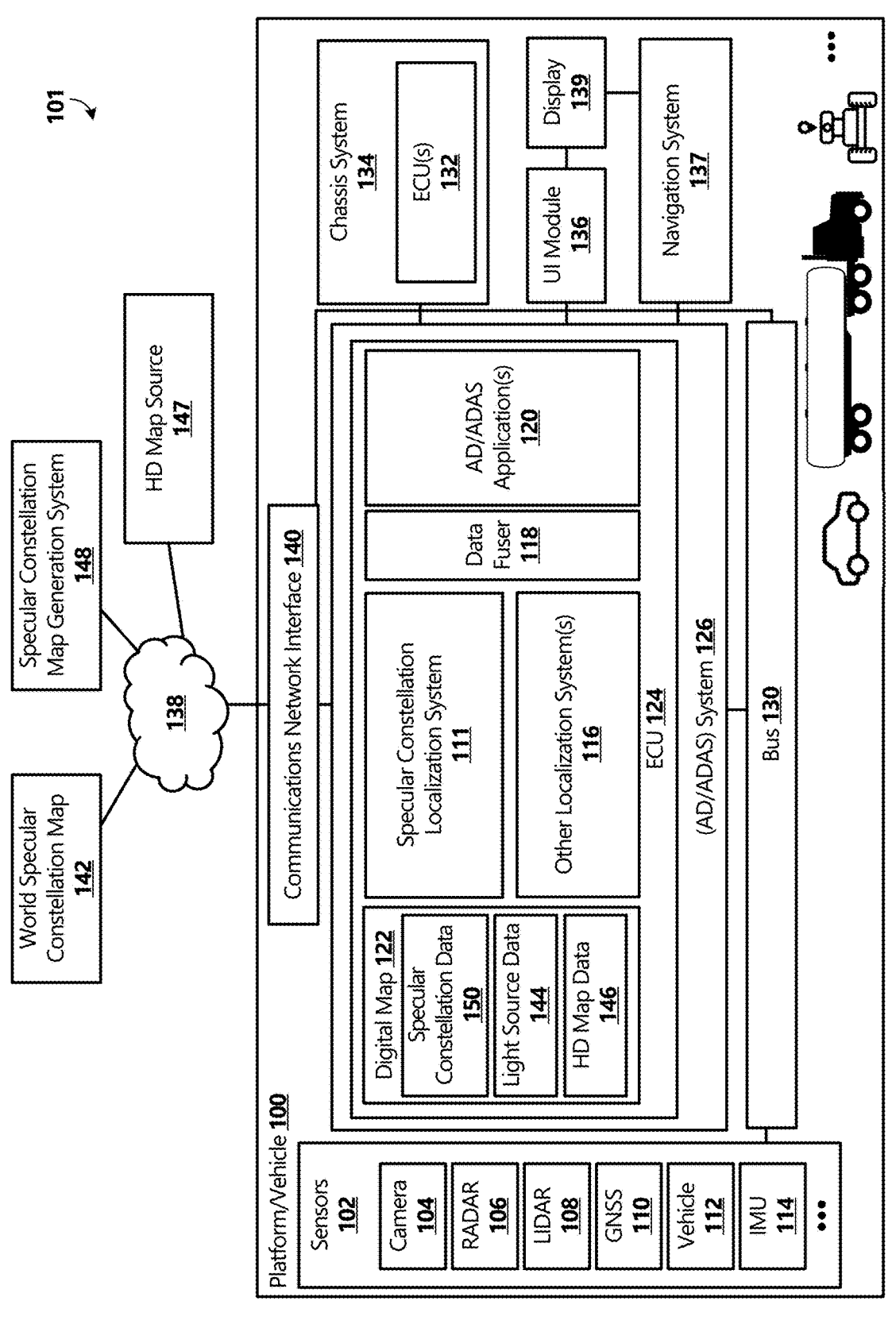
FIG. 1A is a block diagram illustrating an operating environment in which a specular constellation localization system and method may be implemented according to an example.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the present disclosure, but instead, the proper scope of the present disclosure is defined by the appended claims. The following detailed description is, therefore, not to be taken in a limiting sense.

Traditional localization approaches attempt to determine a vehicle's pose (e.g., location and orientation) based on various macro-scale features captured in a vehicle's environment (e.g., topography, building corners, signposts). Low cost approaches typically do not produce results that are within centimeter-level accuracy, while approaches that are able to produce highly accurate results typically involve costly hardware. Accordingly, aspects of the present disclosure describe a specular constellation localization system and method for providing localization of a vehicle based at least in part on specular reflectivity of a driving surface on which the vehicle is driving. In examples, the present systems and methods may be implemented without expensive, specialized hardware.

FIG. 1A is a block diagram illustrating an operating environment 101 in which a specular constellation localization system 111 can be implemented for providing specular constellation localization according to an example. In the example shown in FIG. 1A, the specular constellation localization system 111 is integrated into a platform, such as a vehicle 100. According to examples, the vehicle 100 is an autonomous driving (AD) vehicle or a driver-assisted (e.g., advanced driver assistive systems (ADAS)) vehicle. Non-limiting examples of an AD/ADAS vehicle 100 include a car, truck, bus, robot, scooter, all-terrain vehicle (ATV), aircraft, etc. As shown, the vehicle 100 includes an AD/ADAS system 126. In some examples, the AD/ADAS system 126 uses a combination of sensors 102 to perceive the world around the vehicle 100, and then either provides information to an operator of the vehicle 100 (e.g., via a user interface (UI) module 136 in communication with one or more displays 139), or takes action, when necessary. Generally, the AD/ADAS system 126 includes at least one processor (e.g., one or more electronic control unit (ECU) 124) that operates to receive data from sensors 102, process the data, and map the processed data to various actuator settings (e.g., throttle, brake, and/or steering actuator settings), which are output to one or more chassis systems 134. For example, the AD/ADAS 126 outputs instructions including the actuator settings to control one or more chassis system ECU(s) 132 to control various chassis components.

The chassis systems 134 of the vehicle 100 include various components used to propel the vehicle 100, direct its motion, stop the vehicle 100, allow the vehicle 100 to run smoothly over rough surfaces, etc. For example, the chassis 134 may include, in addition to a vehicle body, an engine, transmission, steering system, braking system, electrical system, and other components controlled by a plurality of ECUs 132. Each ECU 132 may be communicatively connected to a bus 130 including one or more links that allow vehicle components to exchange data (e.g., commands, responses, information) with each other as well as with input and/or output devices. The bus 130 can comprise one or more bus standards, switches, and networks, including but not limited to Ethernet, Communications Area Network (CAN), FlexRay, 12C buses, PC Express buses, etc. Based on received signals, an ECU 132 may be adapted to generate control signals that are transmitted via the bus 130 to a particular component of the chassis system 134.

Additionally, the bus 130 may be communicatively connected to a communication network interface 140 that enables communication with resources over one or a combination of wide area networks 138. One example resource includes a world specular constellation map data source 142. As will be described in further detail below, the world specular constellation map data source 142 may include specular constellation data, light source data, and high definition (HD) map data associated with a plurality of mapped locations. The world specular constellation map may be generated by a specular constellation map generation system 148 and process, which is described below. In some examples, the AD/ADAS system 126 may communicate with the world specular constellation map data source 142 to receive map information, updated map information, updated specular constellation data 150, updated light source data 144, updated HD map data 146, etc.

According to examples, various AD/ADAS applications 120 are included in the AD/ADAS system 126 that use localization data to, for example, assist an operator during driving the vehicle 100, and thereby improve the operator's performance, and/or automatically control operation of the vehicle 100. For instance, controlling operation of the vehicle 100 can include slowing, stopping, or maneuvering the vehicle 100 within an allowed lateral deviation from a planned path based on a detection of obstacles (e.g., other vehicles, pedestrians, or road obstacles large enough to interfere with smooth driving). In other examples, an AD/ADAS application 120 may use localization data for navigation (e.g., via a navigation system 137) or for other decisions. Non-limiting examples of AD/ADAS applications 120 that may be included in the AD/ADAS system 126 include Autonomous/Adaptive/Automatic Cruise Control (ACC), Forward Crash Warning (FCW), Automatic Emergency Braking (AEB), Automatic Parking, Lane Departure Warning (LDW), Blind Spot Warning (BSW), Rear Cross-Traffic Warning (RCTW), Lane Change Assist (LCA), Collision Warning Systems (CWS), among others.

In some examples, the user interface (UI) module 136 is in communication with one or more displays and/or warning/notification indicators (generally referred to herein as displays 139) for displaying information to an operator of the vehicle 100. In some examples, one or more displays 139 accept operator inputs relating to control of the vehicle 100 (or by other controls). In some examples, the displayed information includes information provided by the AD/ADAS system 126. For instance, displayed information is received via the bus 130 and, in some examples, operator inputs (e.g., related to operation of the vehicle 100) are transmitted by way of the bus 130 to the AD/ADAS system 126. In some examples, the navigation system 137 is in communication with the UI module 136 for displaying navigation information to the operator and to accept operator inputs relating to navigation of the vehicle 100.

The sensors 102 can include various types of sensors that operate to collect data representing elements of the environment around the vehicle 100. For example, data can be collected from one or a combination of sensors 102 to help localize the vehicle 100 (e.g., determine where the vehicle 100 is and which direction the vehicle 100 is directed). In some example implementations, data is collected from one or more L2/L4 sensors 102 that may be equipped on the vehicle 100, such as a camera 104 and a Global Navigation Satellite System (GNSS) 110 (e.g., a Global Positioning System (GPS) or other regional satellite navigation system)). In other examples, the vehicle 100 may include other sensors 102 from which data may be collected for localizing the vehicle 100. Data from various sensors 102, for example, may include image data captured by one or more cameras 104, reflected radio waves captured by a radar (radio detection and ranging) 106, reflected laser light waves captured by a LiDAR (light detection and ranging) 108, geo-spatial positioning data received by a GNSS 110, vehicle data (e.g., wheel speed, steering angle) captured by various vehicle sensors 112. In some examples, the sensors 102 further include an Inertial Measurement Unit (IMU) 114, and/or other sensors (e.g., an ultrasonic sensor, an ultraviolet light sensor, an infrared light sensor).

In some examples, the AD/ADAS system 126 includes a digital map 122. For instance the digital map 122 may include map information and other information related to the driving surface 154 within at least a region around the vehicle 100 (e.g., within a distance of several hundred feet/meters to several miles/kilometers of the vehicle 100). For example, other regions of the world specular constellation map data source 142 may be provided to the AD/ADAS system 126 to update the digital map 122 as the vehicle 100 travels. In some examples, and with concurrent reference to FIG. 1B, the digital map 122 includes or has access to mapped specular constellation data 150 associated with patterns of specular reflections 158 from a driving surface 154; light source data 144 of known light sources 152; and HD map data 146 including driving surface and map element information at a centimeter level of accuracy.

The specular constellation data 150, for example, includes pose data 166 (e.g., location and orientation) of reflective objects 160 included in the driving surface 154. For instance, the pose data 166 can include position information of reflective objects 160 in six degrees of freedom (6DOF) in a three-dimensional space (e.g., translation in three perpendicular axes (X, Y, and Z), combined with changes in orientation through rotation about three perpendicular axes (yaw, pitch, and roll). The specular constellation data 150 may further include an estimated degree of reflectivity (e.g., a relative metric) of the reflective objects 160. For instance, reflectivity of a darker reflective objects 160 differs from a lighter reflective objects 160.

The light source data 144 may include location information of various light sources 152. As an example, the sun 152a may be one light source, where an approximate location of the sun 152a relative to the vehicle 100 can be determined based on time, date, and approximate location on earth. As another example, locations of streetlights 152b may be mapped. As another example, a position (e.g., fixed position) of headlights 152c on the vehicle 100 may be a light source, where location of the headlights 152c relative to the one or more sensors 102 may be known.

Figure 1B:
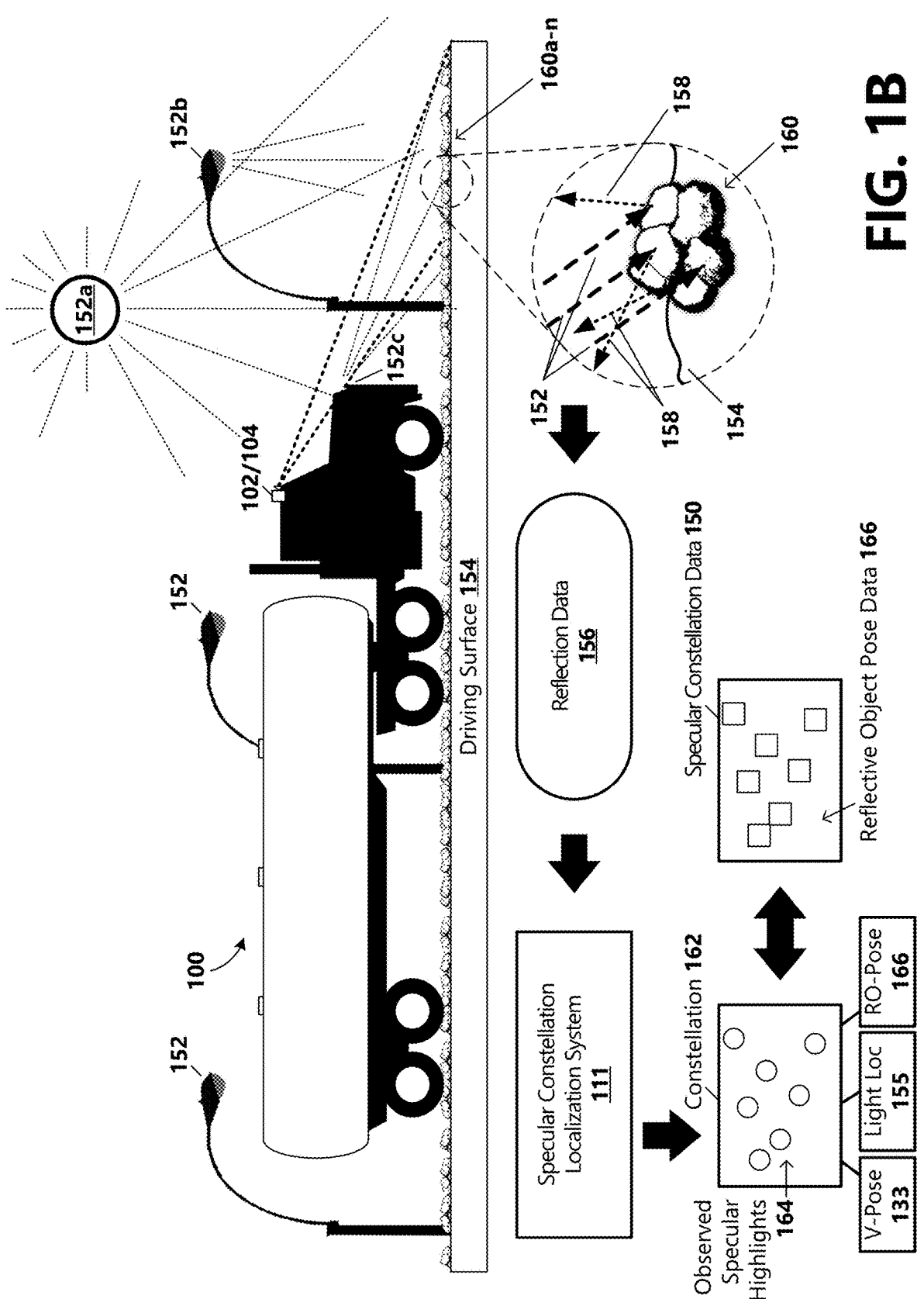

As an example, and with reference to the illustration provided in FIG. 1B, at least one sensor 102 (e.g., a camera 104) on a vehicle 100 collects reflection data 156 corresponding to reflection 158 of light 152 from a light source 152a-152c (collectively, 152) off a plurality of reflective objects 160a-n (collectively, 160) included in a driving surface 154 on which the vehicle 100 is operating. Non-limiting examples of light sources 152 include the sun 152a, streetlights 152b, headlights and/or other lights 152c on the vehicle 100, etc. According to some examples, the reflective objects 160, such as small stones and other objects embedded in the driving surface 154, produce hard specular reflections 158 by reflecting light with an angle of reflection equal to an angle of incidence. According to some examples, the plurality of reflective objects 160 are located along a top-facing surface of the driving surface 154, and are thus co-planar or nearly co-planar. In some examples, a brightness level of the reflections 158 can be correlated to a magnitude of the light source 152. Thus, the reflections 158 can be identifiable by a mass market sensor 102, such as a camera 104, via one or more filtering technique.

As shown, the reflection data 156 collected by one or more sensors 102 is provided to the specular constellation localization system 111. The specular constellation localization system 111 may be configured to process (e.g., filter) the reflection data 156 to extract a constellation 162 of detected/observed specular highlights 164 corresponding to a subset detected/observed reflections 158 of reflective objects 160 in the driving surface 154. The constellation 162, for example, includes a semi-unique pattern of detected specular highlights 164, and is a function of the vehicle's pose 133, the location 155 of the light source(s) 152 causing the detected/observed reflections 158, and the pose 166 of the reflective objects 160. Thus, when the pose 166 of detected reflective objects 160 and the location 155 of the light source 152 is known, an estimated vehicle pose 133 can be determined from a given constellation 162. In some examples, the vehicle pose 166 information includes the location and orientation of the vehicle 100 in 6DOF in a three-dimensional space (e.g., translation in three perpendicular axes (X, Y, and Z), combined with changes in orientation through rotation about three perpendicular axes (yaw, pitch, and roll).

In some examples, the pose 166 of the reflective objects 160 is determined by correlating the constellation 162 to previously mapped specular constellation data 150 (e.g., included in the digital map 122). For example, the specular constellation data 150 includes the pose 166 and reflectivity values of reflective objects 160, which is obtained and used to estimate the pose 133 of the vehicle 100 within, e.g., centimeter-level accuracy. Such highly accurate vehicle pose 133 information can be used for one or more AD/ADAS applications 120. According to an aspect, rather than storing data that is immediately latent in an image (e.g., captured reflection data 156), such as a painted line, building corners, etc., the location, orientation, and reflectivity of the reflective objects 160 can be used to extrapolate a pattern of specular highlights that can be correlated to the constellation 162 for localizing the vehicle 100 in reference to the reflective objects 160.

With reference again to FIG. 1A, the specular constellation localization system 111, for example, can be used alone or in combination with one or more other localization systems 116 to determine the vehicle's pose 133. In some examples, the AD/ADAS system 126 includes a data fuser 118 that fuses data from various sensors 102 and/or localization data (e.g., vehicle pose 133 data) determined by the specular constellation localization system 111 and one or more other localization systems 116) to understand the environment around the vehicle 100.

In some examples, the specular constellation map generation system 148 can be implemented in the environment 100 for generating the specular constellation data 150 and mapping the data to a world (or regional) specular constellation map 142. For example, the vehicle 100 can serve as a mapping vehicle that operates to collect data from various sensors 102 as it travels along various driving surfaces 154 throughout various regions. For example, the mapping vehicle 100 may collect 2D and/or other types of images (e.g., ultrasonic, ultraviolet, infrared). Additionally, the mapping vehicle 100 may collect other data that is used to associate, with the images, a time, a location and orientation (pose 133) of the vehicle 100, location and orientation of sensors on the vehicle 100, light source location 155, time, and other factors (e.g., environmental or atmospheric conditions, lighting level, relative reflectivity of the reflective objects 160), etc. In some examples, the mapping vehicle 100 collects data associated with a section of a driving surface 154 under various atmospheric conditions and/or dispersion characteristics (e.g. overcast, moisture, ozone level, particulate levels (smoke), sun elevation). In some examples, multiple passes or trips are made in relation to a driving surface 154 to collect reflection data 156.

The collected data is provided to the specular constellation map generation system 148, which processes the data for determining accurate pose 166 information of reflective objects 160 in the driving surfaces 154. According to examples, the specular constellation map generation system 148 can filter the images to generate a constellation 162 of specular highlights 164 corresponding to specular reflections 158 of light from the reflective objects 160 in the driving surfaces 154. As mentioned above, the constellation 162 is a factor of the pose 133 of the vehicle 100, the location 155 of the light source 152, and the pose 166 and reflectivity of the reflective objects 160. The pose 133 of the mapping vehicle 100 is known or can be determined with sufficient accuracy and precision based on, for example, GNSS 110 or other data sources. Additionally, the light source location 155 is known based on, for example, date, time of day, map features, etc. Accordingly, based on the generated constellation 162, the pose 166 of the reflective objects 160 can be determined and stored as specular constellation data 150 in the world specular constellation map 142. Thus, when the specular constellation data 150 is later used by the specular constellation localization system 111 implemented in an AD/ADAS vehicle 100 to perform localization, the AD/ADAS vehicle's pose 133 can be determined in real time within a high degree of accuracy using standard (e.g., lower cost) sensors 102 equipped on the vehicle 100. For example, because the information stored about the reflective objects 160 includes the objects' location and orientation, an estimated specular reflection pattern can be determined under various lighting conditions to perform localization of the vehicle 100 using the specular constellation data 150.

Figure 2:
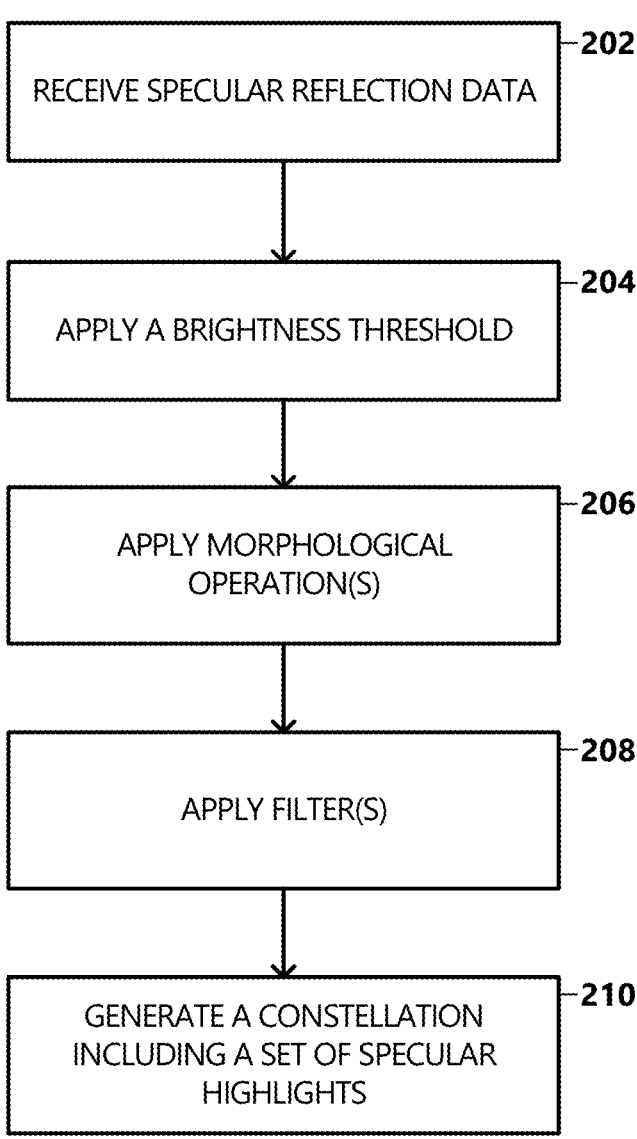
FIG. 2 is a flow diagram illustrating example processing steps of a threshold filtering method that can be used to generate a constellation of specular highlights according to an example.

With reference now to FIG. 2, a flow diagram is provided illustrating example processing steps of a threshold filtering method 200 that can be used to select a subset of specular highlights 164 to include in a constellation 162. In some examples, the method 200 is used to select a constellation 162 to include in specular constellation data 150 in a digital map 122 as part of a specular constellation map generation system process (FIG. 3). In other examples, the method 200 is used to select a constellation 162 when localizing the vehicle 100 as part of a localization process (FIG. 4).

At operation 202, reflection data 156 is received from a sensor 102. As an example, a 2-dimensional image captured by a camera 104 is received. The image/reflection data 156 may include information about the environment around the vehicle 100 within a viewing range of the camera 104.

At operation 204, a threshold is applied to the reflection data 156, such that pixels with brightness values on a lower side of the threshold are turned "off" (e.g., turned to black pixels (0-valued)) and pixels with brightness values on a higher side of the threshold are turn "on" (e.g., turned to white pixels (1-valued). Accordingly, brighter areas in the reflection data 156 are highlighted or masked and darker areas are removed. For example, some of the highlights/masks correspond to specular reflections 158 associated with the driving surface 154, while other highlights/masks may be associated with reflective paint markings, a bright sky, lights, etc.

At operation 206, a set of morphological operations are applied to the highlights/masks to extract the highlights/masks that correspond to specular reflections 158. For example, a dilation and erosion operation may be performed, such that micro (e.g., single pixel) highlights are extracted as points of interest while larger highlights are filtered out or otherwise ignored.

At operation 208, other filters may be applied to select a subset of the micro highlights. For example, various vehicle sensor 112 inputs (e.g., wheel speed, steering angle) may be used to reduce a search space based on known constraints (e.g., vehicle height, camera position, kinematics, etc.). In some examples, particle filtering algorithms and/or other filtering techniques may be applied to filter the highlights to select a subset of specular highlights 164 to include in a constellation 162. The constellation 162 of the select subset of specular highlights 164 may be generated at operation 210.

With reference now to FIG. 3, a flow diagram is provided illustrating example processing steps of a map generation method 300 that can be used to determine and store specular constellation data 150 in a map according to an example. According to examples, the steps are performed by the specular constellation map generation system 148 for generating a world specular constellation map 142 that can be used for vehicle localization. In examples, the world specular constellation map 142 may initially cover particular regions of the earth and may be expanded as additional information is available. At operation 302, reflection data 156 associated with a portion of a driving surface 154 is received. For example, the reflection data 156 may be captured by one or more sensors 102 implemented in a mapping vehicle 100.

At operation 304, the reflection data 156 is processed to generate a constellation 162 of specular highlights 164 corresponding to reflections 158 of a light source 152 off a plurality of reflective objects 160 in the driving surface 154. For example, the reflection data 156 may be processed using the threshold filtering method 200 described above to generate a constellation 162 including a semi-unique pattern of the specular highlights 164.

At operation 306, the location 155 of the light source 152 associated with the reflection data 156 is determined. For example, when the light source 152 is the sun, the location/position of the sun is determined based on the date and time the reflection data 156 was captured and relative to a location of the vehicle 100 (e.g., based on GNSS data). In some examples, when the light source 152 is a headlight 152c on the vehicle 100, the location/position 155 of the headlight 152c may be a fixed position relative to a location of the sensor 102 on the vehicle 100. As such, known information about a make/model of the vehicle 100 may be used to determine the location/position 155 of the headlight 152c relative to a location of the sensor 102 on the vehicle 100. In other examples, locations of streetlights 152b may be mapped. In examples, this may be done by querying a database, using object-recognition technology, or otherwise.

At operation 308, the pose 133 of the vehicle 100 is determined. In some examples, the vehicle pose 133 information is determined based on a high accuracy localization solution included in or in communication with the specular constellation map generation system 148. For example, while the world specular constellation map 142 is being created and refined, the vehicle 100 may comprise specialized hardware and software systems (not generally available on commercially sold vehicles), such as the LiDAR 108, IMU 114, and/or other systems that provide the location and pose of the vehicle 100 within a high degree of accuracy.

At operation 309, data associated with various environmental conditions are received and evaluated. Examples of environmental conditions may include time of day, weather conditions, whether variable light sources 152 are detected (e.g., headlights from other vehicles), etc. The environmental condition-related data is then used at operation 310 to determine pose and reflectivity information of the reflective objects 160.

For example, at operation 310, the pose 166 and reflectivity of the reflective objects 160 are determined based on the location 155 of the light source 152, the pose 133 of the vehicle 100, environmental conditions, and the constellation 162 of specular highlights 164. For example, the reflective object pose 166 information includes values representing the location, orientation, and reflectivity of the reflective objects 160 corresponding to the specular highlights 164 in the constellation 162.

At operation 312, the pose 166 and reflectivity values of the reflective objects 160 are stored as specular constellation data 150 in the world specular constellation map 142, which is used to provide and update the digital map 122 in an AD/ADAS-equipped vehicle 100. For example, the specular constellation data 150 can be used by the AD/ADAS-equipped vehicle 100 to localize the vehicle 100 within, e.g., centimeter-level accuracy.

In some examples, as gradual changes are made to portions of the driving surface 154, at operation 314, updates to the corresponding specular constellation data 150 may be detected and provided to the specular constellation map generation system 148. For example, the specular constellation map generation system 148 may make incremental updates to the specular constellation data 150, which may then be provided to the digital map 122 in an AD/ADAS-equipped vehicle 100. As an example, a mapping vehicle 100 can make multiple passes, at various times, under multiple atmospheric conditions, and/or from various directions over a same driving surface 154 in order to increase the accuracy of the specular constellation data 150 for the particular driving surface 154. In other examples, some changes may be more drastic (e.g., a section of roadway is repaved). Such drastic changes may require for the section of the driving surface 154 to be remapped.

With reference now to FIG. 4, a flow diagram is provided depicting general operations of an example method 400 for performing specular constellation localization according to an example. According to examples, the operations are performed by the specular constellation localization system 111 of the AD/ADAS system 126 for localizing the vehicle 100 using specular reflection data 156. As depicted, the method 400 starts at operation 402, where reflection data 156 associated with a portion of a driving surface 154 is received. For example, the reflection data 156 may be captured by one or more sensors 102 implemented in an AD/ADAS-equipped vehicle 100.

At operation 404, the reflection data 156 is processed to generate a constellation 162 of specular highlights 164 corresponding to reflections 158 of a light source 152 off a plurality of reflective objects 160 in a driving surface 154. For example, the reflection data 156 may be processed using the threshold filtering method 200 described above to generate a constellation 162 including a semi-unique pattern of the specular highlights 164.

At operation 406, the location 155 of the light source 152 associated with the reflection data 156 is determined. For example, when the light source 152 is a headlight 152c on the vehicle 100, the location/position 155 of the headlight 152c may be a fixed position relative to a location of the sensor 102 on the vehicle 100.

At operation 408, specular constellation data 150 associated with the driving surface 154 is accessed. For example, the specular constellation data 150 includes pose 166 information and reflectivity information of reflective objects 160 in the driving surface 154.

At operation 409, information from other relevant sources is received. For example, the information can include environmental information, such as weather, GNSS 110 data, vehicle sensor 112 data, and/or other data used to extract the most relevant specular constellation data from the map.

At operation 410, in some examples, a constellation 162 of specular highlights 164 is estimated based on applying the light source location 155 to the pose 166 information and reflectivity information of reflective objects 160 included in the specular constellation data 150. For example, the location, orientation, and reflectivity of the reflective objects 160 are used to estimate a pattern (i.e., constellation 162) of specular highlights 164.

At operation 412, the estimated constellation and the known pose 166 information and reflectivity information of the reflective objects 160, along with the environmental data and a coarse estimate of location of the vehicle 100 from one or more other systems (e.g., the GNSS 110, radar sensors 106, camera 102), may be used to determine a more precise location within the driving surface 154 that the vehicle 100 must be operating in order to produce the constellation 162 of observed specular highlights 164 that was determined at operation 404. For example, if the location and orientation of the reflective objects 160 are known within an environment, then the actual reflection data can be used to refine the coarse pose estimate from GNSS 110 or otherwise. The determination of correlation between estimated and observed specular highlights 164 may be exact, approximated, estimated with a probability density function over the state space, or found with a convolution over the state space, or by other means that validate an existence of a correspondence/correlation between the observed reflective objects 160 in the driving surface 154 and the estimated constellation 162 generated at operation 404. In examples, when a correlation is not determined, another localization system 116 may be used to determine/refine the vehicle's pose 133.

In various examples, when a correlation is determined, the location, orientation, and reflectivity values corresponding to the estimated constellation 162 are used as reflective object pose 166 values at operation 412 to estimate the vehicle's pose 133. For example, based on the location 155 of the light source 152, the pose 166 of the reflective objects 160, and the constellation 162 of specular highlights 164, the location and orientation of the vehicle 100 is determined.

At operation 414, the vehicle pose 133 information is provided to one or more AD/ADAS applications 120 or to a data fuser 118 for providing one or more AD/ADAS functionalities. In some examples, the estimated vehicle pose 133 is used in conjunction with information from other pose-related vehicle systems (e.g., GNSS 110) to refine a vehicle pose 133 estimate. For example, the refined vehicle pose 133 estimate can be used by the AD/ADAS-equipped vehicle 100 to localize the vehicle 100 within, for example, centimeter-level accuracy.

Figure 5:
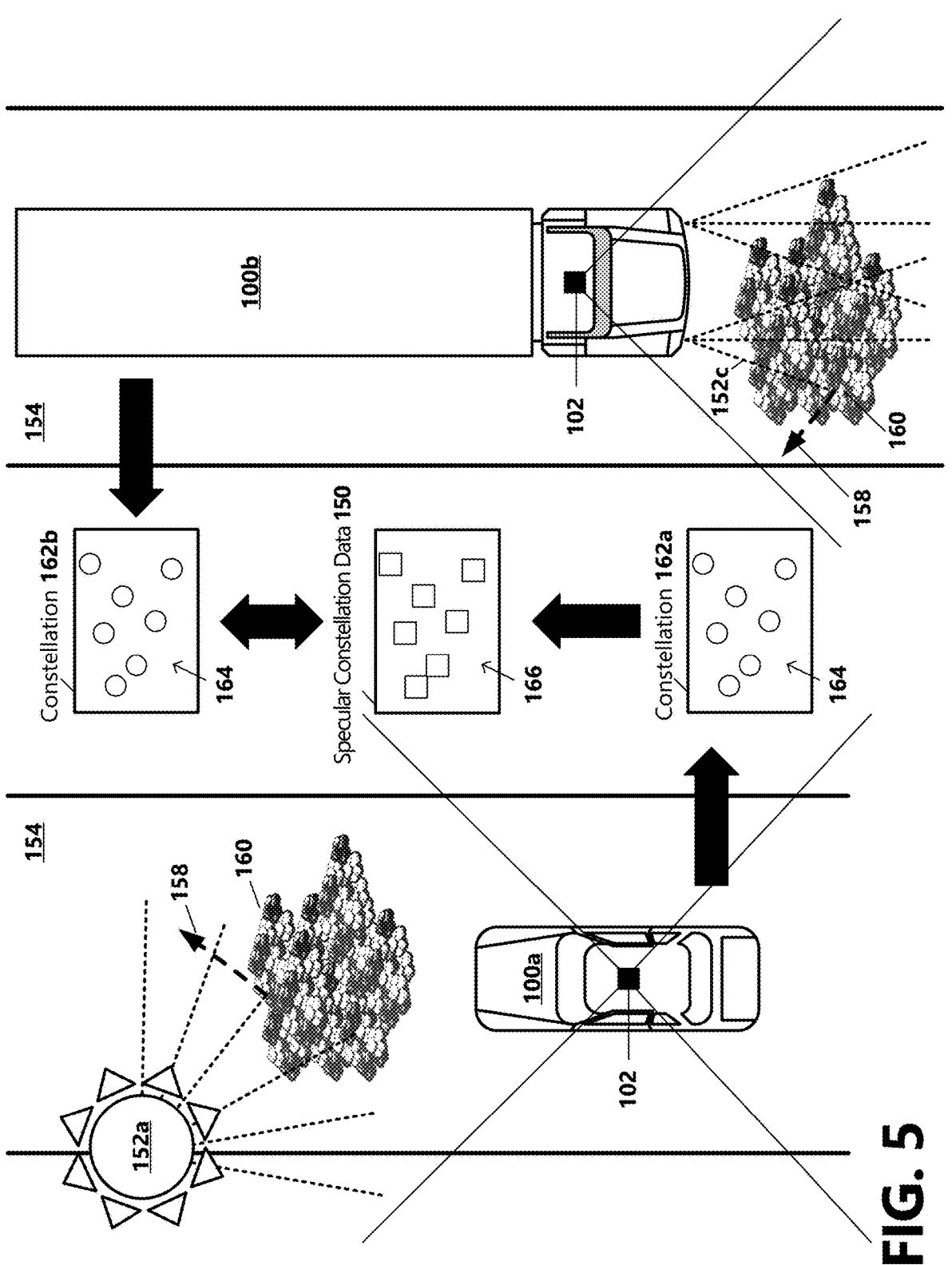
FIG. 5 is an illustration depicting an example scenario where specular reflection data obtained in association with a first light source is used to localize a vehicle based on reflection data obtained in association with a second light source according to an example.

With reference now to FIG. 5, an illustration is provided depicting an example scenario where specular reflection data 150 obtained by a first vehicle 110a in association with at least a first light source 152a is used to, at a later time, localize a second vehicle 100b based on reflection data 156 obtained by the second vehicle 110*b* in association with a second light source 152*c* according to an example. In some examples, the second light source 152*c* is different from the first light source 152*a*. In other examples, the first and second light sources 152 are the same light source, and the reflection data 156 are captured by the vehicles 110*a*, 110*b* at different times, angles, directions, etc.

For example, the first vehicle 100*a* may operate as a mapping vehicle to capture reflection data 156 associated with a portion of a driving surface 154 by one or more sensors 102 implemented in the first vehicle 100*a*. In some examples, the reflection data 156 is processed to generate a first constellation 162*a* of specular highlights 164 corresponding to reflections 158 of a first light source 152*a* off a plurality of reflective objects 160 in the driving surface 154. Based on a known or determined location 155 of the first light source 152*a* (e.g., position of the sun 152*a* relative to the first vehicle 100*a*) and a known or determined pose 133 of the vehicle (e.g., based on a high accuracy localization solution included in or in communication with the specular constellation map generation system 148), the pose 166 and reflectivity of the reflective objects 160 is determined. For example, reflective object pose 166 information includes values representing the location, orientation, and reflectivity of the reflective objects 160 corresponding to the specular highlights 164 in the first constellation 162*a*. The reflective object pose 166 information is stored as specular constellation data 150 in a map (e.g., the world specular constellation map 142).

As further shown, a second vehicle 100*b* may use the specular constellation data 150 to perform real-time localization based on reflection data 156 obtained in association with a second light source 152*c*. For example, the second vehicle 100*b*, operating as an AD/ADAS vehicle, may capture reflection data 156 associated with a portion of a driving surface 154 by one or more sensors 102 implemented in the second vehicle 100*b*. In some examples, the reflection data 156 is processed to generate a second constellation 162*b* of specular highlights 164 corresponding to reflections 158 of the second light source 152*c* (e.g., headlights on the second vehicle 100*b*) off a plurality of reflective objects 160 in the driving surface 154. Based on a known or determined location 155 of the second light source 152*c* (e.g., relative to a sensor 102 on the second vehicle 100*b*) and the specular constellation data 150 included in the digital map 122 (e.g., from the world specular constellation map 142), specular highlights 164 corresponding to spectral reflections 158 of the second light source 152*c* off the reflective objects 160 are estimated. In some examples, the location, orientation, and reflectivity of the reflective objects 160 in the specular constellation data 150 are used to estimate a pattern of specular highlights 164. In examples, based on the second constellation 162*b* of specular highlights 164, the estimated pattern of specular highlights 164, the location, orientation, and reflectivity values corresponding to the reflective objects 160 in the estimated constellation 162, environmental information from other sensors or data sources available to the second vehicle 100*b*, other pose information available to the second vehicle 100*b*, etc., the vehicle's pose 133 may be estimated. For example, based on the location 155 of the second light source 152*c*, the pose 166 and reflectivity of the reflective objects 160, and the second constellation 162*b* of specular highlights 164, the location and orientation of the second vehicle 100*b* is determined in real-time within centimeter-level accuracy.

Figure 6:
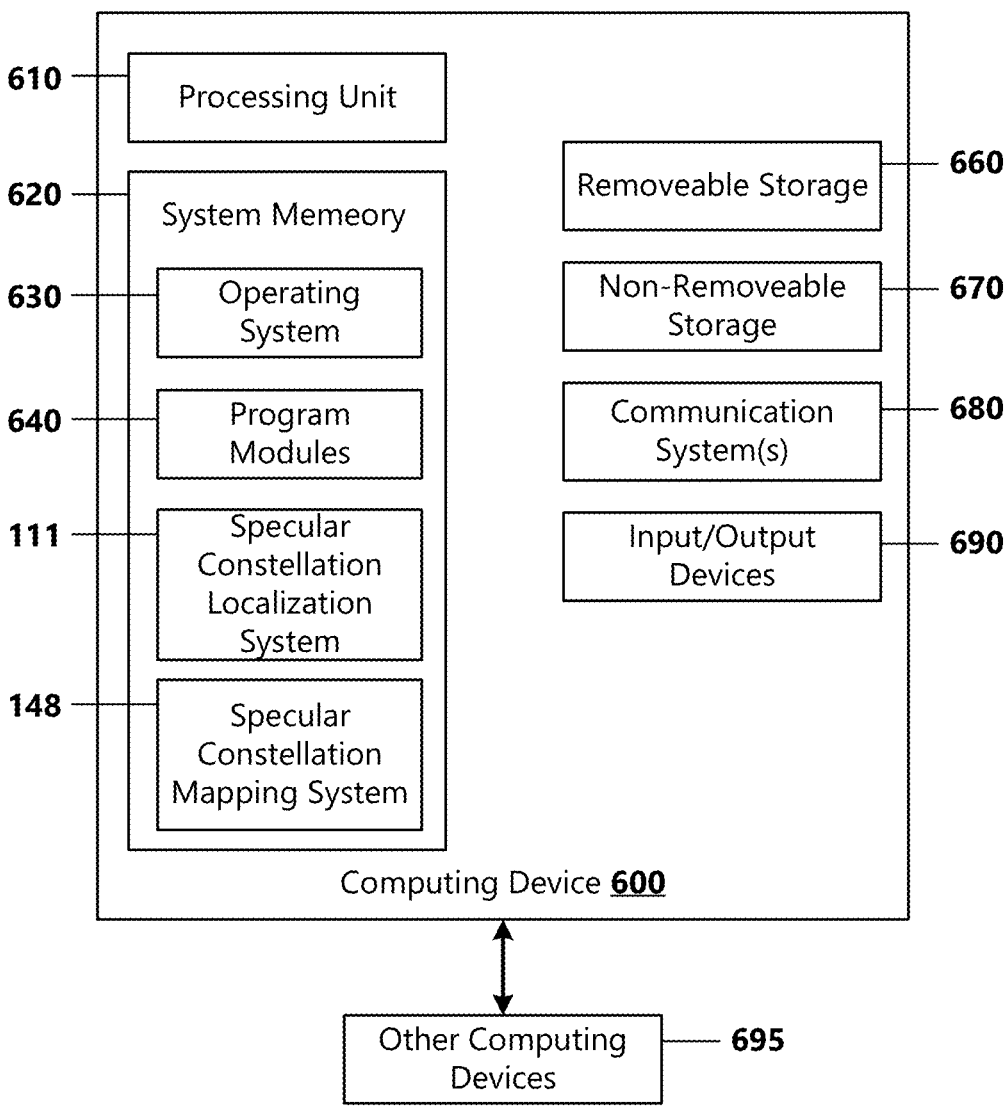
FIG. 6 is a block diagram illustrating example physical components of a computing device or system with which examples may be practiced.

FIG. 6 is a block diagram illustrating physical components of an example computing device with which aspects may be practiced. The computing device 600 may include at least one processing unit 602 and a system memory 604. The system memory 604 may comprise, but is not limited to, volatile (e.g. random access memory (RAM)), non-volatile (e.g. read-only memory (ROM)), flash memory, or any combination thereof. System memory 604 may include operating system 606, one or more program instructions 608, and may include sufficient computer-executable instructions for the specular constellation localization system 111 or the specular constellation map generation system 148, which when executed, perform functionalities as described herein. Operating system 606, for example, may be suitable for controlling the operation of computing device 600. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, flash drives, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

What is claimed:

1. A method for providing localization using specular reflections, comprising:

receiving, by at least one processor and from a sensor on a vehicle, reflection data corresponding to reflections of a light source off a plurality of reflective objects in a driving surface;

generating, by the at least one processor and from the reflection data, a constellation including a subset of observed specular highlights;

determining, by the at least one processor, a location of the light source;

accessing, by the at least one processor, a set of values of mapped reflective objects in the driving surface, wherein the set of values of the mapped reflective objects include pose information and reflectivity information of the mapped reflective objects;

estimating, by the at least one processor, a pose of the vehicle based at least in part on the values of the mapped reflective objects, the location of the light source, and the constellation, wherein estimating the pose of the vehicle comprises:

generating a set of estimated specular highlights of the mapped reflective objects based at least in part on applying the location of the light source to the set of values of the mapped reflective objects in the driving surface, and comparing the set of estimated specular highlights to the subset of observed specular highlights; and automatically controlling, by the at least one processor and using the estimated pose of the vehicle, at least one of a steering or braking system of the vehicle.

2. The method of claim 1, wherein generating the constellation including the subset of observed specular highlights comprises:

applying a brightness threshold to the reflection data; and applying a set of morphological operations that filters out a portion of the specular highlights and includes another portion of the specular highlights in the subset.

3. The method of claim 1, wherein determining the location of the light source comprises at least one of:

determining, based on a timestamp associated with the reflection data, a position of the sun relative to the vehicle;

determining a mapped location of a streetlight; and determining a position of a headlight on the vehicle relative to the sensor.

4. The method of claim 1, wherein accessing the set of values of mapped reflective objects comprises accessing values corresponding to a location, orientation, and reflectivity of the mapped reflective objects.

5. The method of claim 1, wherein receiving reflection data from the sensor comprises receiving data associated with at least one of:

an image captured by a camera;

reflected radio waves captured by a radar;

reflected laser light waves captured by a LiDAR;

geo-spatial positioning data received by a GNSS;

vehicle kinematics data captured by a vehicle sensor;

an ultrasound captured by an ultrasonic sensor;

ultraviolet light captured by an ultraviolet light sensor;

infrared light captured by an infrared light sensor; and an Inertial Measurement Unit (IMU).

6. The method of claim 1, further comprising providing a set of values corresponding to the pose of the vehicle to an autonomous driving (AD) or an advanced driver assistive system (ADAS) application.

7. The method of claim 1, wherein estimating the pose of the vehicle further comprises refining the estimated pose of the vehicle using information from at least one other location system.

8. A method for providing localization using specular reflections, comprising:

receiving, by at least one processor and from a sensor on a vehicle, reflection data corresponding to reflections of a light source off a plurality of reflective objects in a driving surface;

generating, by the at least one processor and from the reflection data, a constellation including a subset of observed specular highlights;

determining, by the at least one processor, a location of the light source;

determining, by the at least one processor, a pose of the vehicle;

determining, by the at least one processor, a set of values representing a pose of reflective objects associated with the subset of observed specular highlights based on the location of the light source, the pose of the vehicle, and the constellation including the subset of observed specular highlights, wherein the set of values of the mapped reflective objects include pose information and reflectivity information of the mapped reflective objects;

storing, by the at least one processor, the set of values in a map;

estimating, by the at least one processor, a pose of the vehicle using based at least in part on the values of the mapped reflective objects, the location of the light source, and the constellation, wherein estimating the pose of the vehicle comprises:

generating a set of estimated specular highlights of the mapped reflective objects based at least in part on applying the location of the light source to the set of values of the mapped reflective objects in the driving surface, and comparing the set of estimated specular highlights to the subset of observed specular highlights; and automatically controlling, by the at least one processor and using the estimated pose of the vehicle, at least one of a steering or braking system of the vehicle.

9. The method of claim 8, wherein generating the constellation including the subset of observed specular highlights comprises:

applying a brightness threshold to the reflection data; and applying a set of morphological operations that filters out a portion of the specular highlights and includes another portion of the specular highlights in the subset.

10. The method of claim 8, wherein determining the location of the light source comprises at least one of:

determining, based on a data and time associated with the reflection data, a sun position relative to the vehicle;

determining a mapped location of a streetlight; and determining a position of a headlight on the vehicle relative to the sensor.

11. The method of claim 8, wherein determining the set of values representing the pose of the reflective objects associated with the subset of observed specular highlights comprises determining values corresponding to a location, orientation, and reflectivity of each of the reflective objects.

12. The method of claim 8, wherein determining the pose of the vehicle comprises determining the pose of the vehicle based on Inertial Measurement Unit (IMU) data.

13. The method of claim 8, further comprising:

receiving indications of changes to the driving surface; and updating the map with values representing the changes.

14. A system for providing localization using specular reflections, comprising:

at least one processor; and memory storing instructions that, when executed by the at least one processor, cause the system to:

receive, from a sensor on a first vehicle, reflection data corresponding to reflections of a first light source off a plurality of reflective objects in a driving surface;

generate, from the reflection data, a first constellation including a subset of observed specular highlights;

determine a location of the first light source;

access a set of pose values of mapped reflective objects in the driving surface, wherein the set of values of the mapped reflective objects include pose information and reflectivity information of the mapped reflective objects;

estimate a pose of the first vehicle based at least in part on the pose values of the mapped reflective objects and the location of the light source, wherein estimating the pose of the vehicle comprises:

generating a set of estimated specular highlights of the mapped reflective objects based at least in part on applying the location of the light source to the set of values of the mapped reflective objects in the driving surface, and comparing the set of estimated specular highlights to the subset of observed specular highlights; and automatically control, using the estimated pose of the vehicle, at least one of a steering or braking system of the vehicle.

15. The system of claim 14, wherein prior to receiving reflection data from the sensor on the first vehicle, the instructions further cause the system to:

receive, from a sensor on a second vehicle, reflection data corresponding to reflections of a second light source off the plurality of reflective objects in the driving surface;

generate, from the reflection data received from the sensor on the second vehicle, a second constellation including a subset of observed specular highlights;

determine a location of the second light source;

determine a pose of the second vehicle;

determine the set of pose values, wherein the set of pose values represents a pose of reflective objects associated with the subset of observed specular highlights based on the location of the second light source, the pose of the second vehicle, and the second constellation including the subset of observed specular highlights; and store the set of pose values in a map.

16. The system of claim 15, wherein the first light source and the second light source include at least one of:

the sun;

a street light;

a headlight on the first vehicle; and a headlight on the second vehicle.

17. The system of claim 15, wherein the set of pose values comprises values corresponding to a location, orientation, and reflectivity of the reflective objects associated with the subset of observed specular highlights.

18. The system of claim 15, wherein:

the second vehicle is a mapping vehicle; and the first vehicle is an autonomous driving (AD) or an advanced driver assistive system (ADAS) vehicle that uses the pose of the first vehicle to perform an AD/ADAS function.

19. The system of claim 15, wherein the first light source is different from the second light source.

* * * * *